US008956164B2

(12) United States Patent  
Terpstra et al.

(10) Patent No.: US 8,956,164 B2  
(45) Date of Patent: Feb. 17, 2015

(54) METHOD OF TEACHING READING AND SPELLING WITH A PROGRESSIVE INTERLOCKING CORRELATIVE SYSTEM

(71) Applicant: InterEthnic, LLC, Dallas, TX (US)

(72) Inventors: Beverly N. Terpstra, Dallas, TX (US); Susan Jean Mortimer, Duncanville, TX (US)

(73) Assignee: InterEthnic, LLC, Dallas, TX (US)

(*) Notice: Subject to any disclaimer, the term of this patent is extended or adjusted under 35 U.S.C. 154(b) by 48 days.

(21) Appl. No.: 13/644,953

(22) Filed: Oct. 4, 2012

(65) Prior Publication Data

US 2013/0273511 A1    Oct. 17, 2013

Related U.S. Application Data

(63) Continuation of application No. 10/211,071, filed on Aug. 2, 2002, now abandoned.

(60) Provisional application No. 60/309,585, filed on Aug. 2, 2001.

(51) Int. Cl.
  *G09B 19/06*    (2006.01)
  *G09B 17/00*    (2006.01)

(52) U.S. Cl.
  CPC .............. *G09B 17/00* (2013.01); *G09B 17/003* (2013.01); *G09B 17/006* (2013.01)
  USPC ......................................................... 434/156

(58) Field of Classification Search
  USPC .................. 434/185, 156, 178, 169
  See application file for complete search history.

(56) References Cited

U.S. PATENT DOCUMENTS

| 4,478,583 | A | | 10/1984 | Sellers | |
| 4,768,959 | A | * | 9/1988 | Sprague et al. | 434/156 |
| 4,884,972 | A | * | 12/1989 | Gasper | 434/185 |
| 5,429,513 | A | | 7/1995 | Diaz-Plaza | |
| 5,743,740 | A | | 4/1998 | Visser et al. | |
| 6,299,452 | B1 | | 10/2001 | Wasowicz et al. | |
| 6,305,942 | B1 | * | 10/2001 | Block et al. | 434/156 |
| 6,334,776 | B1 | | 1/2002 | Jenkins et al. | |
| 6,755,657 | B1 | * | 6/2004 | Wasowicz | 434/167 |
| 2002/0164563 | A1 | * | 11/2002 | Wasowicz et al. | 434/178 |
| 2005/0069848 | A1 | | 3/2005 | Cytanovich | |

OTHER PUBLICATIONS

Eagle's Wings for Spelling, Reading, and Writing by Mortimer and Smith, dated 1996.*
Integrated Learning Systems—An Introduction by Mark Baker; 1997.*

(Continued)

*Primary Examiner* — Robert J Utama
(74) *Attorney, Agent, or Firm* — Baker & Hostetler LLP

(57) ABSTRACT

The invention teaches students all of the graphic representations of phonemes and orthography using a series of word charts (covering over 18,000 independent words) and integrated program materials. The graphic representations of phonemes are presented to a student according to the frequency of use in words and in the language, and the progressive dependence of one set of graphic representations of phonemes on another. The teaching methods of this invention provide a system for learning how to decode and encode as interchangeable skills. Thus, the student learns to reason out the sounds and spelling of thousands of words. Integrated program learning materials provide mnemonic devices to reinforce the learning in a systematic way.

8 Claims, 8 Drawing Sheets

(56) References Cited

OTHER PUBLICATIONS

"Targetless" Schwa: An Articulatory Analysis by Catherine P. Browman and Louis Goldstein; Haskins Laboratories Status Report on Speech Research, dated 1990.*

Hou tu pranownse Inglish © 2000 by Mark Rosenfelder.*
Clymer, Theodore, "The Utility of phonic generalizations in the primary grades", The Reading Teacher, Nov. 1996, 50(3), 182-187.
EaglesWings Comprehensive Handbook of Phonics, 6 pages.
Sample Word Sorts by Spelling Stage, Words Their Way Appendix, 2000 by Prentice-Hall, Inc.

* cited by examiner

FIGURE 1

Orthographic Comparison for Teaching Long Vowels and Diphthongs

| Vowel Sound | Silent 'e' | Vowel Team | 'l' Con-trolled | 'n' Con-trolled | 'r' Con-trolled | End of words 'y' or 'w' | Chifz | Silent 'gh' | Vowel Team (ending) | Basic Suffixes | Orthographic Comparison |
|---|---|---|---|---|---|---|---|---|---|---|---|
| 1) Long 'i': bite, sty | ● | | | | | | | | | | Beg/ending position |
| 2) Long 'i': fire | | | | | ● | | | | | | Consonant controlled |
| 3) Long 'e': baby, heat | | ● | | | | ● | | | | | Beg/ending position |
| 4) Long 'e': fear, steer | | ● | | | ● | | ● | | | | 2 spellings-same sound |
| 5) Long 'a': cape, bay | ● | | | | | ● | | | | | Beg/ending position |
| 6) Long 'a': nail, pain | | ● | | ● | | | ● | | | | 2 spellings-same sound |
| 7) Long 'a': bear, hair | | ● | | | ● | | | | | | Consonant controlled |
| 8) Long 'a': praise | | ● | | | | | | | | | Consonant controlled |
| 9) Long 'oo': moon | | ● | | | | | ● | | | | 2 spellings-same sound |
| 10) Long 'u': lute, cute | ● | | | | | | ● | | | | 2 spellings-same sound |
| 11) Long 'o': boat | | ● | | | | | ● | | | | 2 spellings-same sound |
| 12) Long 'o': cope, nose | ● | | | | | | | | | | Consonant Controlled |
| 13) Diphthong 'oi': oil | | | ● | | | ● | | | | | Consonant Controlled |
| 14) Short 'o' as 'ă' | | | | | | | | | | | Consonant Controlled |

FIGURE 3

PICS PATENT FOR GRADES 1 & 2

| Vowel Sounds | ā | ē | ī | å | ō | ū/ü | ou/oi |
|---|---|---|---|---|---|---|---|
| silent 'e' | cape<br><br>7a | silent 'e' rarely helps an 'e'. | hike<br>style<br>1a | | cope<br><br>15a | cute<br>lute<br>12 | |
| l / n | nail<br>pain<br><br>8 | field<br>yield<br><br>2 | child<br>kind | tall<br>bald<br>malt<br>lawn<br>18/21 | cold<br>toll<br>molt<br>grown<br>18/21 | | owl<br>town<br><br>17 |
| Vowel teams | mail<br>rain<br>bait<br>paid<br>9 | feel<br>heat<br>brief<br>receive<br>5a | | fraud<br><br>20b | boat<br><br>14 | moon<br><br>11 | oil<br>ouch<br><br>16/17 |
| r | hair<br>care<br>bear<br><br>9 | fear<br>steer<br><br>5b | fire<br><br>1b | cart<br><br>19 | corn<br>more<br>soar<br>warm<br>19 | cure<br><br>22 | flour (1 syl)<br>flower (2 syl)<br><br>22 |
| Suffixes | taping<br><br>4a | eagle<br><br>25 (intro) | diving<br>flying<br>4a/4b | collar ('all' in 1 syl. = 'oll' in 2 syl.) | bony<br><br>6 R | super<br><br>23 R | outer<br>boiling<br><br>24 R |
| cliffz™ | maze<br>praise<br>7b/24 | cheese<br>decrease<br>26 (intro) | slice<br><br>1b | sauce<br><br>25 (intro) | nose<br><br>15b | huge<br>snooze<br>12/13 | choice<br>house<br>16/17 |
| word endings | say<br>grey<br>café<br>7a | baby<br>see<br>sea<br>6 | shy<br>pie<br><br>1a | law<br><br><br>20a | follow<br>arrow | few<br>blue<br><br>12/13 | toy<br>cow<br><br>16/17 |
| gh | eight | | high<br><br>3 (intro) | taught<br>ought | dough | through | bough |
| other spellings | reign | brownie | sign<br><br>3 (intro) | want<br>squat<br>20c | hoe<br><br>15 | suit | |

Chart 10: Short 'oo' with 'k' and 'd'

FIGURE 4

| Title | Chart Order | Eagle Wing's Chart Order |
|---|---|---|
| Short Vowel followed by One Consonant | 1 | 1 |
| Consonant Clifz: ck, l, f, s, z | 2 | 2 |
| Silents 'e' | 3 | 3 |
| Beginning Blends | 4 | 4 |
| Beginning Blends and Consonant Cliffz | 5 | 5 |
| Ending Blends: ng | 6 | 6 |
| Long vowel comb.: ai, ay, ee,ea,oa, 'oo,' and 'ew' (for reading only). | 7 | |
| Diphthongs: oi/oy, ou/ow (for reading only). | 8 | |
| Digraphs | 9 | 8/9 |
| Syllables: 'ing', 's' (verb 'runs') | 10 | 40 |
| 'ed' makes three sounds | 11 | 42 |
| 's' and 'es' for plural nouns | 12 | 41 |
| Long 'i': spelled with 'ld' and 'nd" | 13 | 16 |
| Suffixes: Adding '-er" and "-en' | 14 | 44 |
| Suffixes: Adding '-ed' | 15 | 42 |
| 'Y' Substitutes for 'i' and 'e' | 16 | 17 |
| Double Consonants and 'y' | 17 | 43 |
| 'y' changes back to 'i' | 18 | 40 |
| Suffixes: Adding '-er', "-est" (adj.) | 19 | 44 |
| Long 'e': spelled 'ee' 'ea' | 20 | 13 |
| Long 'a' in 'ai' | 21 | 11 |
| Short 'oo' with 'k' and 'd' | 21 | 21/22 |
| The two sounds of Long 'u': 'u' and 'oo' | 22 | 21/22 |
| 'u-(c)-silent 'e' and '-ue' | 23 | 21/22 |
| When 'a' says short 'u' (intro) | 24 | 23 |
| Long 'o': spelled 'oa' | 25 | 18/19 |
| 'o-(c)-silent 'e' and 'oa' and 'ow' | 26 | 18/20 |
| Diphthongs: 'oi' and 'oy' | 27 | 25 |
| Diphthongs: 'ou' and 'ow' | 28 | 25 |
| Interchangeable sounds of 'a' and 'o' | 29 | 26 |
| 'r' with 'o' and 'a' | 30 | 26 |
| Before and after 'w' | 31 | 25/26 |
| 'o' and 'a' with 'n' | 32 | 25/26 |
| 'w' and 'qu' before 'a' | 33 | 54/69 |
| The Sounds of 'r' | 34 | 28 |
| 'r' with the vowels | 35 | 29 |
| Consonant Cliffz: 'j' 'v' and 'f' changes to 'v' | 36 | 10/37 |
| Words ending with 'le' | 37 | 36 |

FIGURE 5A

| Title | Chart Order | Eagle Wing's Chart Order |
|---|---|---|
| 'c', 's', and 'z' need silent 'e' | 38 | 32 |
| 'x' says 'ks' | 39 | 60 |
| Introduce suffixes: 'tion,' 'shun' and 'cian' (reading only) | 40 | 48 |
| Long 'i': multisyllable words | 41 | 17 |
| Long 'i': plural nouns with 'i' from singular 'us' | 42 | 17 |
| Long 'e': spelled 'ee' and 'ea' multisyllable words | 43 | 14 |
| 'ie' or 'ei' with Consonant Cliffz: 'ld', ve, 'ge', 'ce' | 44 | 13 |
| Long 'e': multisyll. wds. endings 'i', 'ie', 'ee', 'ey' and 'ly | 45 | 14/15 |
| Long 'e': multisyll. wds. endings change with parts of speech | 46 | n/a |
| Long 'a': words ending with 'eign', 'eil' | 47 | 11 |
| Long 'a': multisyllable words | 48 | 12 |
| Long 'oo' and Short 'oo' in multisyllable words | 49 | 22 |
| 'a' makes the schwa sound in multisyllable words | 50 | 23 |
| 'o' and 'a' with 'r' | 51 | 29/68 |
| 'a' with 'w' and 'u' when 'u' replaces 'w' | 52 | 69 |
| 'le' as nouns, verb, (some adj.) | 53 | 36 |
| 'c', 's', and 'z' with silent 'e': multsyllable words | 54 | 32/33 |
| Two sounds of 'g' (for spelling and reading) | 55 | 61 |
| 'g' and 'v' at the end of words | 56 | 37/63 |
| Suffix 'er' says 'ur' | 57 | 44/45 |
| Digraphs: Initial and final only position in words | 58 | 56/58 |
| 'ough/augh' | 59 | 58 |
| Suffixes:'tion,' 'tive,' 'shun,' 'cian' | 60 | 48/49 |
| suffixes: 'ture,' 'cher' and 'tor' | 61 | 46 |
| 'el' and 'al' as adjectives | 62 | 33/34 |
| final 'j' as 'g' | 63 | 58/62 |
| intro: 'g' as /g/ with 'gue' (no schwa) | 64 | 62 |
| 'th' and 'sh' in the medial position of words | 65 | 56 |

FIGURE 5B

METHOD OF TEACHING READING AND SPELLING WITH A PROGRESSIVE INTERLOCKING CORRELATIVE SYSTEM

CROSS-REFERENCE TO RELATED APPLICATIONS

This application is a Continuation of U.S. patent application Ser. No. 10/211,071 filed Aug. 2, 2002, which is based on and claims priority to provisional application 60/309,585 filed Aug. 2, 2001. These applications are both , which is hereby incorporated by reference.

FIELD OF THE INVENTION

The invention relates generally to teaching reading and spelling, and more particularly to teaching graphic representations of phonemes and word study according to a comprehensive strategic methodology based upon the frequency and complexity of phonemes and phonograms in the language and to developing a logical and strategic method to assess a student's awareness and ability of how phonemes and letters work.

BACKGROUND OF THE INVENTION

Researchers, educators, and inventors have long recognized that a student learning to read and spell must master certain phonetic principles and abilities. Because English is roughly fifteen percent phonetically irregular, a student typically learns rules for pronouncing and spelling. Many methods have been used to teach pronunciation and spelling rules—one of these methods is phonics.

Traditionally, the philosophy of teaching reading and spelling can be divided into two schools. The first, known as the Fernald Method, discussed in Grace Fernald's *Remedial Techniques in Basic School Subjects*, published in 1943 by McGraw Hill, uses a whole word approach that emphasizes a repeated exposure to the word and the understanding of the word within a context. The teaching of phonemes occurs indirectly without a systematic approach. Hence, reader intuition and visual memory are a part of the process.

The second school of teaching reading and spelling, known as the Gillingham Method, discussed in *Remedial Teaching* by Anna Gillingham and Bessie W. Stillman, published by Educators Publishing Service in 1960, uses a sound blending approach of each phonetic sound.

These methods and their derivatives suffer from multiple criticisms. For example, they are criticized as exacerbating the number of inconsistencies in the English language, requiring good visual memory for success, supporting learning solely by memorization and the ability to know whether the text appears to be correct, slowing the reading process into a mechanical procedure which prevents fluidity of thought and decreasing the ability to comprehend the text, discouraging the continuity of the discovery of meaning in symbols, and compounding a student's negative feelings from the reading and writing process with the learning of all subjects. Recognizing that neither method is entirely satisfactory, researchers, educators, and inventors have sought to identify phonetic patterns, groups, or rules to reduce and simplify memorization of rules for instruction in phonemes. For example, U.S. Pat. No. 4,661,074, to Walker, discloses a multi-sensory systematic teaching system derived from analysis that utilizes six monosyllabic phonetic rules and colored mnemonic teaching devices. U.S. Pat. No. 5,421,731, to Walker, on the other hand, discloses utilizing polysyllabic phonemes.

Furthermore, researchers, educators, and inventors have attempted to develop methods for teaching phonetic rules. U.S. Pat. No. 4,030,211, to McGinley, discloses a set of complementary charts for teaching and testing word pronunciation and spelling. U.S. Pat. No. 4,115,932, to Charlesworth, discloses a phonetic system for teaching phonics by associating various colors with phonemes. U.S. Pat. No. 4,262,431, to Darnell, discloses a teaching device including drawers and color-coded letters to teach phonemes. U.S. Pat. No. 4,650,423, to Sprague, discloses an apparatus and method for teaching pronunciation by associating phonemes with pictures of mouth positions. U.S. Pat. No. 4,713,008, to Stocker, discloses a method for teaching a set of indicia to represent the sounds of the language without using the skill of phonemic segmentation.

Such previous systems and methods have recognized the fundamental problem of teaching phonics, namely the need to develop a systemic approach in identifying groups or classes of phonemes and teaching them effectively, however, they failed to develop a proper method for categorizing graphic representations of phonemes. Conventional phonetic systems categorize phonemes exclusively according to vowels, digraphs, and occasionally a modifying letter, such as final /e/ or internal /r/. These conventional categorized systems teach phonetic rules according to the categorization, although such teaching according to categorization may not be efficient for student learning. Conventional categorizations typically fail to include enough categories to adequately span the language, and they greatly fail to account for the interaction or influencing effect of adjoining letters or phonemes.

Susan Mortimer and Betty Smith in *Comprehensive Handbook of Phonics,* published by Eagles Wings in 1990, identify and disclose a method of categorizing phonemes based upon a set of criteria including:

1. The consonant following the vowel dictates the sound the vowel makes and its spelling. (The letters most affecting the vowels are /l/, /n/, /r/, /w/.)
2. Several consonants, designated as cliffs(z), and all vowels change their spelling at the end of words.
3. Silent 'e' helps both vowels and consonants.
4. For a rule to be valid, words that break the rule must be accounted for and limited in number.

Mortimer and Smith made two significant advances in their classification system. First, they recognized that a terminal letter or letters in a phoneme, rather than a vowel, have a stronger influence in pronunciation. Second, they recognized that adjoining letters, consonants and/or vowels, affected one another more that had been previously considered.

In following their phonetic rules, Mortimer and Smith recognized that each alphabet letter has a unique pronunciation behavior characteristic that is inherent in the character but is influenced by any adjoining characters in the phoneme. In their method, each letter could be visually represented by a fantasy character, whose environmental behavior is displayed with the fantasy character's dress and personality. For example, the letter 'a' is a crying baby in diapers, who says short a because he is always crying. These fantasy characters live on Alphabet Island and are mnemonic for phonetic sounds and orthographic rules.

Although Mortimer and Smith made advances, the system was inadequate for several reasons. They used only a limited set of words of the English language, and consequently omitted many words from the classification system and fantasy personalities. Also, they failed to account for phonemes with identical pronunciation but different letters (or graphic representation). Further, they failed to account for polysyllabic words and suffixes. Most importantly, they failed to develop a comprehensive strategic method for teaching the phonetic rules. Mortimer and Smith, like their predecessors, taught phonemes according to a classification, rather than some other system. Teaching by classification may not result in efficient student learning.

Therefore a need exists for a system and method for teaching reading and writing according to a comprehensive strategic method of the graphic representations of phonemes without teaching solely by classification.

SUMMARY OF THE INVENTION

The invention relates to a system for identifying and categorizing graphic representations of phonemes and teaching these graphic representations to students. The categorization encompasses a specific order to word charts that include multi-syllabic words, overlapping graphic representations (homonyms and similar problems), and suffixed words.

According to an aspect of the invention, a student's phonetic competence is assessed based upon the student's understanding of graphic representations of phonemes and orthographic patterns.

According to another aspect of the invention, the order in which the graphic representations of phonemes are taught is arranged to enhance the efficiency of the education process. The word charts illustrating the graphic representations of phonemes are taught in an order that gives consideration to frequency of use, complexity, dependence upon other groups, and the abilities of the child.

According to a further aspect of the invention, new material is taught as a review of the graphic representations of phonemes.

According to yet another aspect of the invention, specific word features are taught to support a student's growth in conceptual knowledge of three general layers of information—graphic representations of phonemes, orthography, and vocabulary.

These and other features of the invention will be more fully set forth hereinafter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the several views of the drawings, and wherein:

FIG. 1 is a word chart of the graphic representations of long 'e' in one syllable and two syllable words by Eagle's Wings.

FIG. 3 is a chart illustrating an orthographic comparison for teaching long vowels and diphthongs, in accordance with an embodiment of the invention;

FIG. 4 is a chart illustrating the word chart categorizations for long vowels and diphthongs to encompass a larger universe of words and includes multi-syllabic words, overlapping graphic representations (homonyms and similar problems), and suffixed words, in accordance with an embodiment of the invention;

FIGS. 5a and 5b together comprise a chart illustrating a comparison of the new chart order of the teaching method of this invention and Eagle's Wings Comprehensive Handbook of Phonics.

DETAILED DESCRIPTION OF ILLUSTRATIVE EMBODIMENTS

Figure 2A:
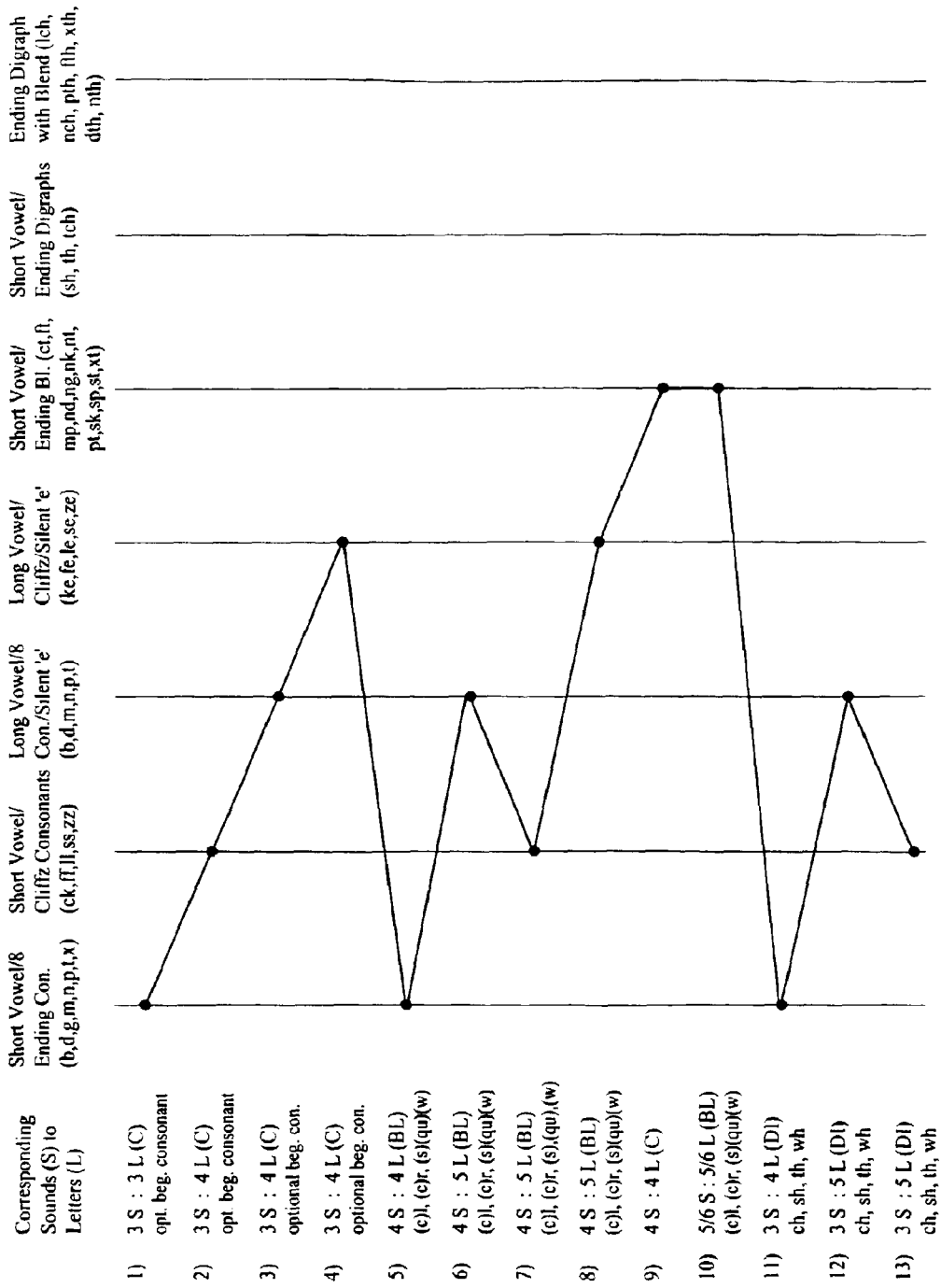
FIGS. 2a and 2b together comprise a chart illustrating a progressive sequence for teaching short vowels with ending consonants, in accordance with an embodiment of the invention.

The following definitions will be understood by those skilled in the art but are being offered here to provide a context for the description that follows.

Definitions

The following terms are hereby defined for use herein.

1. Allophones: slight variations in production of vowels and consonants that are predictable variants of a phoneme (e.g., short 'a' in 'fast' and 'tank', short 'o' in 'on' and 'call').
2. Affix: a letter or a group of letters attached to the beginning or ending of a base word or word root that adds to or changes its meaning or grammatical form and creates a derivative.
3. Alphabet: a series of letters or signs arranged in a fixed sequence, each of which represents a spoken sound of that language. (Knowledge of the 26 letters of the English alphabet is essential to the language skills—phonics, reading, writing, and spelling.)
4. Alphabetic principle: the relationship between letters ordered left to right in a written word and the phonemes ordered in a specific temporal sequence in the spoken word. (Knowledge of the alphabetical principle is essential to the ability to read an alphabetic language.)
5. Antonyms: words of opposite meaning.
6. Automaticity: ability to respond or react without attention or conscious effort. (Automaticity in word recognition permits full energy to be focused on comprehension.)
7. Base word: a word to which affixes are added (e.g., like in likeable). A base word can stand alone.
8. Blend: two or three adjacent consonants whose sounds flow smoothly together. (When a suffix is added to a base word with a short vowel the consonant sounds split apart (e.g., mask, masking).)
9. Closed syllable: a syllable ending with one or more consonants (e.g. pat, bank).
10. Compound word: a word composed of two or more smaller words (e.g., goodbye). (A compound word may or may not be hyphenated depending on its part of speech.)
11. Consonant: a letter representing a speech sound produced by a partial or complete obstruction of the air stream by any of various constrictions of the speech organs (e.g., 'p', 'f', 'r').
12. Complexity: the number of variables in a word(s) that are interconnected or interwoven parts or function letter(s) (e.g. cake has three sounds and four letters, c makes the /k/ sound due to the 'a' follows the 'c', the 'a' makes its long sound due to the 'e' at the end of word that is preceded by a vowel and a consonant.
13. Decode: word recognition in which the phonic code is broken; to determine the pronunciation of a word by noting the position of the vowels and consonants.
14. Digraph: two adjacent consonants in the same syllable representing a single speech sound that is unique to the combination of individual sounds of either consonant (e.g., 'sh' in shack).
15. Diphthong: two adjacent vowels in the same syllable whose sounds slide together to create a sound that is unique to the combination of individual long or short sound of either vowel (e.g., 'oi' in toil, 'oy' in boy).
16. Final: pertaining to or occurring at the exact end; the very last letter or sound in a word or syllable.

17. Final consonant-preceding vowel phonemic combination: pertaining to the effect of the consonant on sound of the preceding vowel.
18. Formative data: information about a child's progress in acquiring particular skills or knowledge to be applied to short-term instructional goals. (Formative data is usually collected using criterion- and curriculum-referenced tests.)
19. Frequency: the number of times an event, particularly a phonemic pattern, occurs in a given category (e.g., frequency of multiple spellings of the long 'i' sound as in like, light, lie or the frequency of a words used in literature as in the, and).
20. Function: a letter and/or phoneme that impacts the sound and spelling of words according to the proximity of another letter(s).
21. Functional shift: a shift in the syntactic function of a word, as when a noun serves as a verb.
22. Graphic organizers: visual displays of information to help a student recall previously learned material.
23. Homophones: words that sound like another but have different spellings and meaning (e.g., bear and bare).
24. Hierarchy: a series in which each element is graded or ranked.
25. Initial: the first or beginning sound or letter in a word or syllable.
26. Irregular word: a word that has an unexpected spelling either because its orthographic representation does not match its pronunciation (e.g., colonel) or because it contains an infrequent orthographic representation of a sound (e.g., search).
27. Letter cluster: group of two of more letters that regularly appear adjacent to each other.
28. Long vowel: a vowel sound that is produced by a slightly higher tongue position than the short vowels. (The long vowel sounds are usually the same as their names (e.g., 'a', 'e', 'o' and 'u'))
29. Mnemonic strategies: any formal scheme designed to improve memory; devices for grouping needed facts to support the orthographic memory.
30. Morpheme: the smallest meaningful linguistic unit.
31. Onset: the initial written or spoken single consonant or consonant cluster in a word (e.g. /f/ in fast or /f/ /l/ in flip).
32. Open syllable: a syllable ending with one of the following: a long vowel sound, a short 'o' sound spelled with 'au,' or the short 'u' sound known as the schwa.
33. Orthographic memory: memory of letter patterns and word spellings.
34. Orthographic maker: a system of signs used to account for the various phonemic components in a word; a labeling system to identify the function of the letters in orthographic patterns with specific markings.
35. Orthographic pattern: a sequential use of phonemes usually in a certain position in words.
36. Orthography: the correct sequences of letters in the writing system.
37. Phoneme: an individual sound unit in spoken words; the smallest unit of speech that makes one word distinguishable from another (e.g., /f/ makes fat distinguishable from vat).
38. Phonemic awareness: awareness of the smallest units of sound in the speech stream and the ability to isolate or manipulate the individual sounds in words.
39. Phonemic/orthographic correspondence: the sound and its spelling that correspond to create regular words.
40. Phonemic position: of or pertaining to the phoneme as found at the beginning, middle or end of a word; of or pertaining to the sequence of phonemes within a group of letters.
41. Phonetic: of or pertaining to a system of phonemes (speech sounds) and their relation to graphic or written symbols.
42. Phonics: paired association between letters and letter sounds; an approach to teaching of reading and spelling that emphasizes sound-symbol relationships.
43. Phonograms: a group of words or word families that have the same final letters (e.g., the 'an' phonogram consists of man, can, ban, pan, ran).
44. Proximity: the existence of a letter being next to certain letters that impacts the sound and spelling of words (e.g. an 'e' that follows a vowel and a consonant as in kite is silent).
45. Reading readiness: experience and skills that lead to learning how to read (e.g., listening to books read aloud, letter naming, phonological awareness, motivation).
46. Regular words: words that are spelled the way they sound, also call phonetically regular words.
47. Rime: consists of the vowel and what follows, usually one or two consonants (e.g., 'an' in man).
48. Schema: student's prior knowledge and experience relevant to the new topic insofar as it contributes to a frame of reference, factual or attitudinal, for the new information creating links or structures through which the new information can be assimilated.
49. Schwa: an unaccented vowel whose pronunciation approximates the short 'u' sounds, such as in the 'a' in above or in dependant.
50. Short vowel: a vowel that is pronounced with a short sound; an arbitrary sound that is unrelated to any aspect of the letter, such as the name of the letter.
51. Sight word: a word that is immediately recognized as a whole and does not require decoding to identify.
52. Sound picture: letter or word written with diacritical markings indicating pronunciation.
53. Suffix: a morpheme attached to the end of a word that changes the form or use of that word in a sentence (e.g. 's' in cats, 'ing' in letting).
54. Syllable: a spoken or written unit that must have a vowel sound.
55. Synonyms: words of similar meaning.
56. Syntax: the system by which words may be ordered in phrases and sentences; sentence structure; grammar.
57. Tracking: the ability to fingerpoint while reading a text, demonstrating the concept of a word.
58. Transitional stage: stage in spelling development in which a child's spelling is very similar to conventional spelling of a word (e.g. lik for like).
59. Unstable digraphs: adjacent vowels that appear to be vowel diphthongs but participate in separate syllables and therefore have distinct sounds (e.g., theatre, create).
60. Visual discovery: information gained by sight; guided discovery of a reading or spelling rules through looking at written language.
61. Vowel: a class of open speech sounds produced by the easy passage of air through a relatively open vocal tract (e.g. the letters a, e, i, o, u, and y when it makes the sound of long i, short i, or long e).
62. Vowel-consonant-silent e syllable: a one syllable word or a final syllable of a longer word in which a final silent e signals that the vowel before the consonant is long (e.g., game, bate, ate, hide.)
63. Whole-language approach: a perspective on teaching literacy based on beliefs about teaching and learning that include the following; Reading can be learned as naturally as speaking; reading is focused on constructing meaning from text; and reading is best learned in the context of the group.

How the Research was Conducted

Word charts were created for use in the teaching methodology of the invention. These word charts were created in phases, keeping in mind the limitations in conventional phonics approaches.

Phase 1: Initial research began with an understanding of the accepted phonemic rules and the accepted practice for teaching these rules.

Phase 2: Conducted an assessment of the phonemic rules according to the efficacy of the students to learn and apply the rules to text specifically in the areas of reading fluency, reading comprehension and spelling.

Phase 3: Conducted an evaluation of the word charts published the Eagle's Wings Comprehensive Handbook of Phonics according to the efficacy of the students to learn and apply the rules to text specifically in the areas of reading fluency, reading comprehension and spelling.

Phase 4: Examined the validity of the research illustrated in the Eagle's Wings handbook by assessing all of the graphic representations of phonemes and cross-referencing the orthographic patterns with numerous dictionaries and computerized word programs.

Phase 5: A continuous sorting of the word lists and a comparison of the graphic representations of phonemes identified additional variables by which the research process was repeated in an effort to re-examine and redefine the phonemes and orthographic patterns.

Phase 6: Developed a system to analyze the graphic representations of phonemes and orthography based on a hierarchy of the function of letters, the frequency of the phonemes and phoneme clusters in words and the frequency of words in the language.

Phase 7: Compiled and modified new word charts with the repetitive sorting and matching process to identify more accurate phonemic representations and comprehensive orthographic patterns.

Phase 8: Assigned a word chart order (see FIG. 5) to illustrate the hierarchy of the function of letters, the frequency of the phonemes and phoneme clusters in words and the frequency of words in the language to develop a progressive, correlative and interlocking system for teaching decoding and encoding skills.

Phase 9: Based on the findings of the new word charts and word chart order for teaching decoding and encoding skills, additional assessments provided the means to develop all mnemonic devices as well as an inherently logical sequence to account for all of the phonemic components present in the English language.

Research Steps

1. Conducted the study of currently accepted phonemic approaches which teach reading and spelling.
2. Evaluated the word charts in the Eagle's Wings Comprehensive Handbook of Phonics to verify whether all of the graphic representations of phonemes and orthography were correctly used and recorded.
3. Identified the inconsistencies in the graphic representations of phonemes and orthographic patterns with multisyllable words and the lack of attention of the impact of the schwa in the Eagle's Wings material.
4. Identified when the graphic representation of phonemes and the orthographic patterns in multisyllablic words deviated to create a different or inconsistent pattern (e.g. 1) parish, the 'a' makes the long 'a' sound when followed by 'r' and the succeeding syllable begins with a vowel or 2) bargain, the 'a' makes the short 'o' sound when followed by 'r' and the succeeding syllable begins with a consonant.
5. Made preliminary observations about the layout of the word charts and the word chart order in Eagle's Wings Handbook in light of developing a teaching tool to assist students to efficiently learn to read and spell.
6. Identified the frequencies of the orthographic patterns—how often was the pattern used in the English language.
7. Identified and categorized the function of certain consonants according to the complexity and difficulty of the student to hear the phonemes.
8. Identified the inconsistent words that do not follow an orthographic pattern (does) or contradicts an orthographic pattern (has, yes) according to the frequency of use in literature.
9. Developed a system of hierarchy that reflects the function (s) and frequency all the graphic representations of phonemes and orthographic patterns in words and in the language.
10. Developed a system for teaching reading and spelling based on the complexity and frequency of the orthographic patterns.
11. Created a new word chart order according to the hierarchy developed in Step 5. Added new charts to illustrate the use of suffixes, the schwa and multisyllabic words.
12. Developed the materials for teaching the word charts according to the graphic representations of phonemes and orthographic patterns on each chart (see Explicit Skill Instruction below).

The resulting teaching order of the word charts are depicted in FIG. 5 with reference to the Eagle's Wings word charts.

Becoming a Competent Analytical Reader: A Teaching Method and Process

Engendering reading competency in children reflects a multifaceted process comprised of seven tasks within three reading phases: Reading Readiness, Functional Literacy, and Competent Analytical Reading. In accordance with the teaching method of the invention, the tasks performed by the students are as follows:

Phase 1: Reading Readiness

Task 1: Learn the graphic representations of phonemes of the English language and the discovery of meaning in symbols.

Task 2: Learn the function(s) of the graphic representation of phonemes as separate and combined entities.

Task 3: Combine graphic representations of phonemes according to their function(s) to read and spell words in sentences.

Task 4: Acquire vocabulary by "unlocking" the meaning of unfamiliar words through contextual clues.

Phase 2: Functional Literacy

Task 5: Read and listen for comprehension to narrative and informative texts.

Task 6: Write for expression of ideas in narrative and informative formats.

Phase 3: Competent Analytical Reader

Task 7: Evaluate the presuppositions of the author and the evidence of the text.

Development of competency in each phase is highly dependent on the ability to master the skills of the previous phase. The link in this learning process, as identified by brain-wave research is the teaching methods for attaining Task 2: Learn the function(s) of the graphic representations of phonemes as separate and combined entities. While the invention provides comprehensive teaching methods to support the mastery of this task, other approaches use a teaching method that places the emphasis on sounding out the phonemes beginning with the first letter and moving to the end of the word. In contrast, the invention teaches the students to sound out words by determining how the succeeding letter or digraph impacts the sound of the previous letter(s). Such a strategy eliminates haphazard guessing of the graphic representations of phonemes. Additionally, due to the well-defined sound-symbol relationships taught in accordance with the technique of the invention, students directly benefit by accomplishing the subsequent two tasks: Task 3: Combine graphic representation of phonemes according to their function to read and spell words in sentences, and Task 4: Acquire vocabulary by "unlocking" the meaning of unfamiliar words through contextual clues. The systematic approach to specific word features contained in this invention engender the student's growth in the conceptual knowledge of the three general layers of linguistic information—graphic representations of phonemes, orthography, and vocabulary—to become competent analytical readers.

An Integrated Teaching Methodology

The teaching methods of the invention include three overlapping aspects: 1) a progressive aspect of learning in which a primary concept is maintained with various components while always preserving the primary concept throughout its application in words. 2) An interlocking aspect in which the achievement of all learning helps prepare for the next sequence and for increased levels of complexity. 3) A correlative aspect wherein differentiation between similar patterns and word meaning enables the reader to more effectively learn the proper use of words. In fine, these progressive, interlocking, and correlative aspects promote a tight system to achieve the goals of reading competency and enjoyment.

Systematic Scope and Sequence

The teaching methods of the invention provide a comprehensive design for word study that explicitly teaches necessary skills—graphic representation of phonemes, orthography, high-frequency word recognition, decoding and encoding strategies, and vocabulary—in a timely manner to engage the student's interest and motivation to learn about how words work and to apply word skills to reading and spelling. The invention discloses a system for teaching decoding and encoding skills with comprehensive word charts that are based on a specific order of the word charts published by Eagles Wings.

Figure 1:
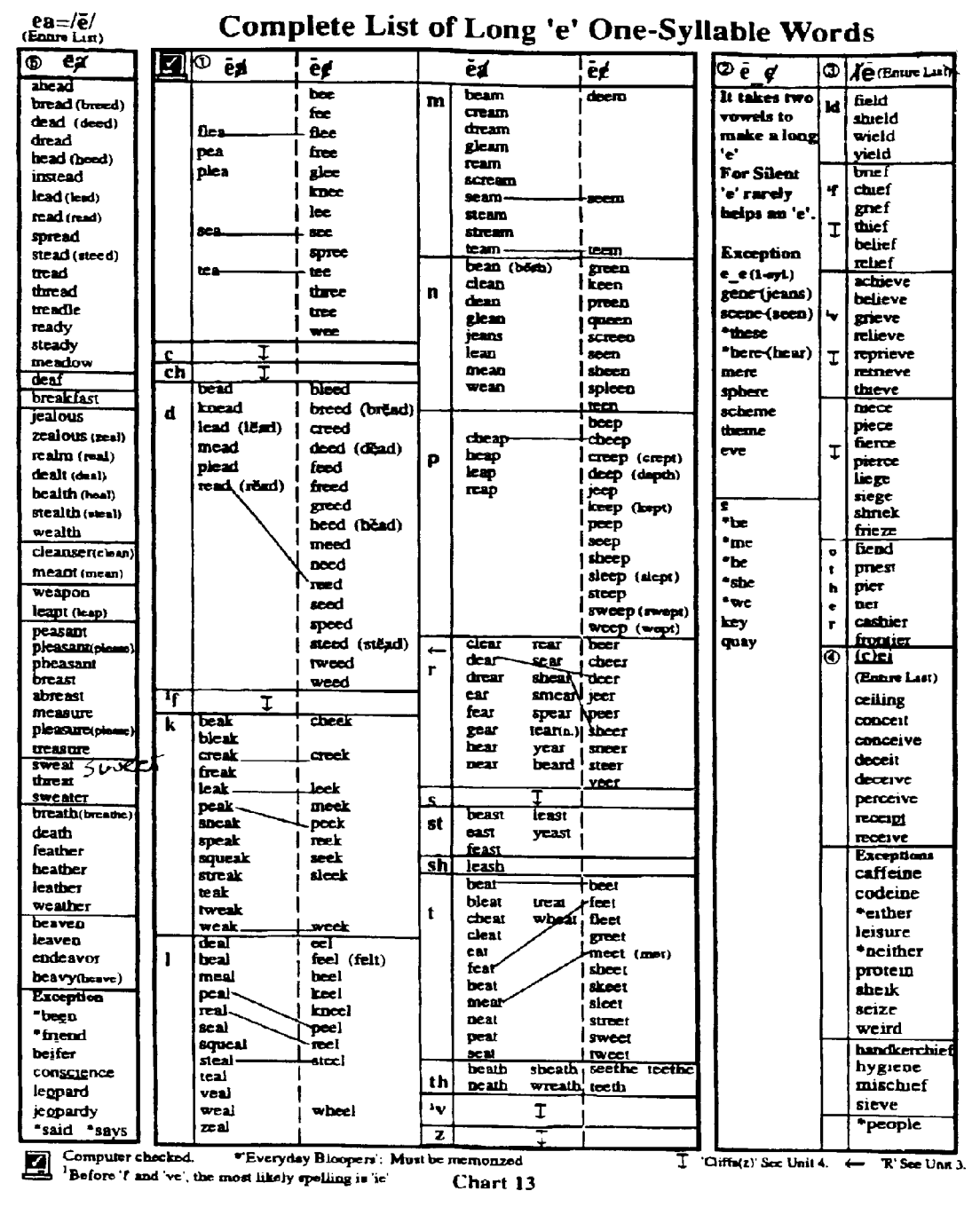

Eagle's Wings Comprehensive Handbook of Phonics illustrates word charts based on research of the phonemes in words. The presentation of the word charts provides topical information in the following order: consonants with short vowels, long vowels, ends of words, suffixes, letter studies (reference Eagle's Wings Handbook, pgs. 3-5). While the word charts cover many topics related to phonemes and orthography this system does not promote an effective system for teaching decoding and encoding skills. This topical presentation has many limitations, including a linear approach to encoding and decoding words that negatively impacts the student's application of reading and writing text. The chart order in Eagle's Wings lacks a progressive approach to acquiring a knowledge of the graphic representations of phonemes and orthography. There is no identifiable hierarchy for supporting the student's abilities. For example, FIG. 1 illustrates Eagle's Wings Chart 13: Complete List of Long 'e' One-Syllable Words lists all the words that make the long 'e' sound and are spelled with 'ea,' 'ee,' and 'ie'. FIG. 1 also shows the words that make the short 'e' sound and are spelled 'ea.' The word chart or the information in the Eagle's Wings handbook (reference pg. 66) does not teach a hierarchy of the words based on complexity or difficulty of the phonemes in the words. The words listed in the center columns on FIG. 1 under the headings 'ea' and 'ee' have more consistent sounds and spellings than the words listed under the first and last columns and should be taught prior to the other spellings.

Figure 2B:
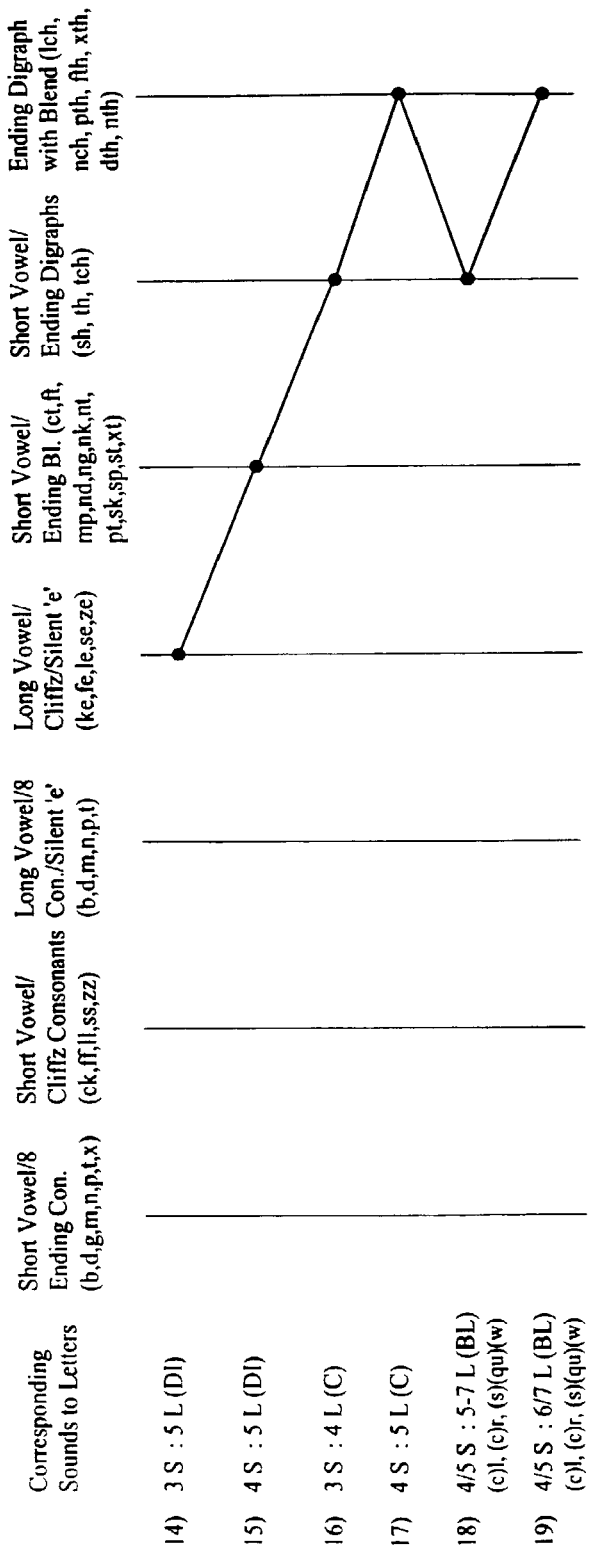

The purpose of this invention is to modify the word charts previously published by Eagle's Wings to create a teaching system based on the function, frequency and hierarchy of the graphic representations of phonemes and orthography. The new word charts reflect a dynamic approach to acquiring decoding and encoding skills to increase the usage of words and to apply word skills to reading and writing. This dynamic approach is based on an examination of the function(s) of all the graphic representations of phonemes and a categorization of the complexity for hearing the sounds and/or recalling from memory the orthographic patterns. FIGS. 2a and 2b illustrates the order of complexity with a comparison of the number of sounds to the number of letters on certain charts. The first listing on FIG. 2a shows words with three sounds and three letters creating a one-to-one letter/sound correspondence. On the other hand, listing #12 shows three sounds and five letters with two letters that have a different function than creating an independent phoneme. This figure also shows other variables such as the ending consonants and optional beginning letters as identified under the sound/letter ratio for each chart.

Further, the order of the word charts of this invention are based on an analysis of two other categories: one sound-to-many spelling patterns and one spelling pattern-to-many sounds. FIG. 3 illustrates many examples of one sound-to-many spelling patterns. Number 5 and 6 show how the phoneme long 'a' can be spelled with silent 'e', 'ai' digraph, or at the end of words with 'y.' Number 4 shows the phoneme cluster long 'e' followed by 'r' as one sound-to-many spelling patterns with the words fear and steer.

Due to the research described above, the invention provides a hierarchical design of phonemes and word study, from easier one-to-one correspondences between letters and sounds, to more sophisticated relationships between meaning units as they relate to sound and pattern. For example, the research shows a frequency of six spelling patterns with long 'i' in one syllable words. A comparison can be conducted of long 'i' as shown on FIG. 4 (the number in each square delineates to progressive approach to teaching all the words with long 'i' sound and/or spelling):

long 'i' found in the medial and final position in words (i.e. bite, sty).

medial long 'i' with consonant controlled spellings (i.e. fire, lice).

long 'i' followed by the same consonant sound but different spelling (i.e. site, sight).

long 'i' violates other rules ('i' is long with the ending blends 'nd' and 'ld', e.g., blind)

Research by Ehri (1997), Frith (1985) and Juel (1991) has shown that there is a remarkable consistency between the stages of encoding development and the stages of decoding acquisition. Specifically, the ability to recognize and recall words with fluidity promotes a higher level of comprehension and interaction with the text. The teaching methods of this invention provide a system for learning how to decode and encode as interchangeable skills. Conventional phonics programs teach the isolated sounds of a phoneme without a comprehensive presentation of phoneme clusters in words. These programs also lack a strategy to examine the function and frequency of graphic representations of phonemes or the variables that arise in orthography. For example, the phonemes 'au' makes the short 'o' sound and changes its spelling to 'aw' when this sound occurs at the end of words or when followed by 'l' or 'n'.

The invention disclosed herein provides a progressive, interlocking and correlative system that identifies a method for teaching the changing position of the schwa in relation to accented syllables, the application of suffixes and a comparison of short vowels, long vowels, digraphs, diphthongs and the use of the schwa in other languages or accents in English. For example, British English uses the schwa differently than American English (e.g. in American English the name Beatrice uses the 'a' as a schwa to make the short 'u' sound. In British English the 'a' in Beatrice is a short 'a' sound. Thus, British English allows for short vowel sounds to stand alone in a syllable.

The reordering and modification of the word charts published by Eagle's Wings is demonstrated in FIG. 5. These changes provide the means to create a learning system with mnemonic devices to reinforce the learning of the program materials. For example, a system of labeling the letter function(s) assists with student to identify the graphic representations of phonemes and to reason out the spelling of every word. Another example is the Alphabet Crew characters that support the learning of the letter sounds. Echo E teaches both the long and short sounds of 'e,' and more importantly, the short sound is found at the beginning of her name for easy recognition of a difficult sound. Kinesthetically, the students practice making the sound of short 'e' with an echo by placing their hand to the side of their mouth.

As the students use the techniques of the invention, they may develop their abilities to examine graphic representations of phonemes and orthography and develop a similar level of abstraction in their thinking. Students may become comfortable with graphic representations of phonemes that involve various components that if changed create new words (Tasks 2 and 3 described above). With changes in the ability to study and use abstract patterns, students also may begin to think more about their spoken vocabulary.

Explicit Skill Instruction Using Integrative Mnemonic Strategies

Figure 6:
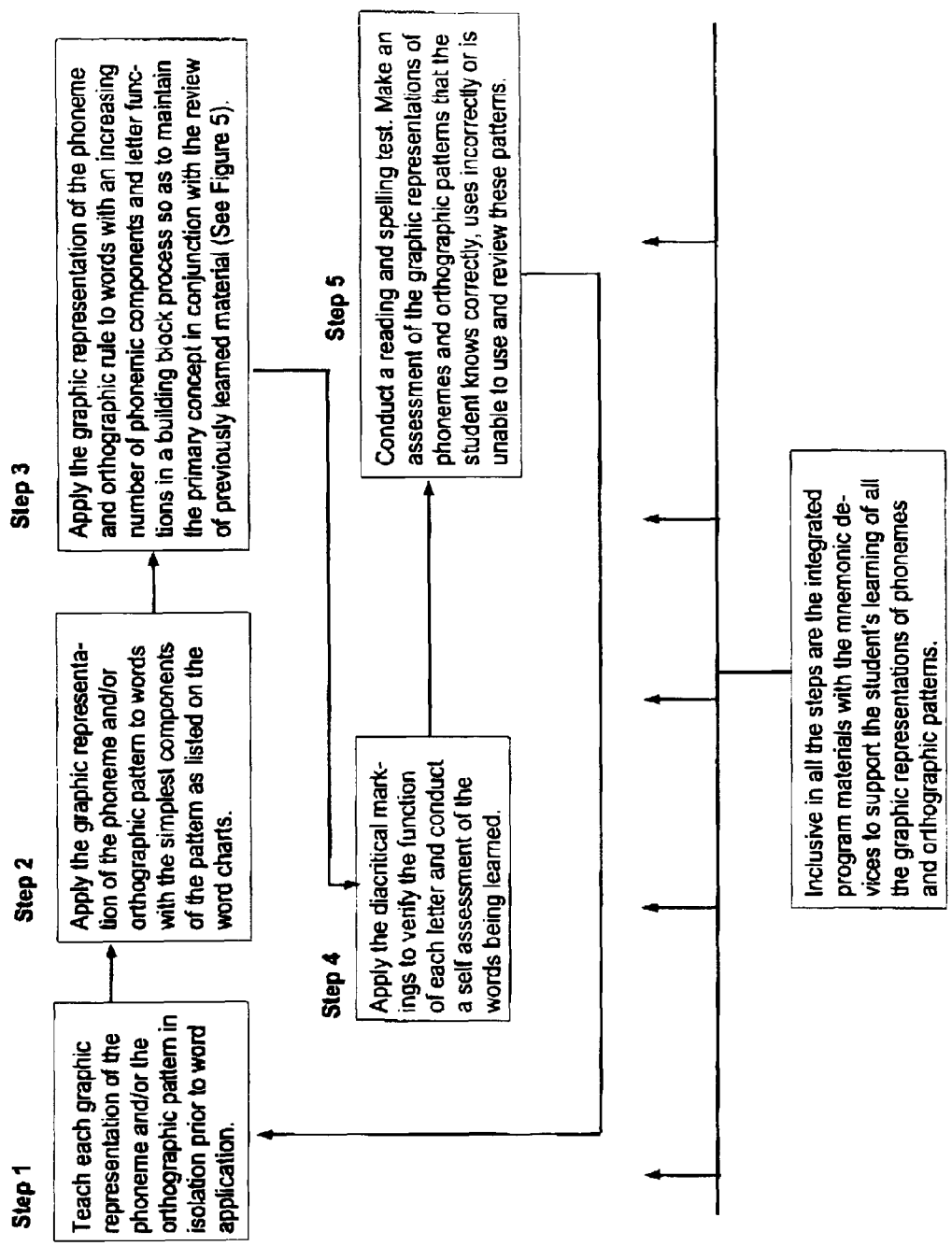
FIG. 6 illustrates the teaching methodology for explicit skill instruction using the techniques of the invention.

Explicit skill instruction in the graphic representations of phonemes, orthography, sight word fluency and word meaning are presented with integrated program materials (see description below). The materials provide the overarching layers of sophistication necessary to challenge the students with higher thinking skills (i.e. analysis and application) and the ability to reason out the spelling of thousands of words. In accordance with the teaching method of the invention, the teacher uses the word charts from the Eagle's View text (modified as described above) in the order set forth in FIG. 5 in order to provide a systematic approach that matches the student's ability level. Thus, students can learn the relationships among graphic representations of phonemes, orthography, and vocabulary progressively in response to the teaching methodology of the invention. Such teaching methodology is depicted in FIG. 6 and is embodied in the following teaching steps:

1. Teach each graphic representation of a phoneme and/or orthographic rule in isolation prior to word application ('i' is long with ending blends 'ld' and 'nd').

For example, use a story and a song to teach the phonemic and orthographic rule via auditory/rhythmic learning. Apply the stories and songs repetitively throughout the lessons to encourage listening and speaking activities. Integrate hand/body movements to support kinesthetic learning.

2. Apply the graphic representation of a phoneme and orthographic rule to words with the simplest components of the rule (i.e. 'bind' only one additional letter to 'ind'). Begin this application process with the words that have similar phonemic components and the least amount of phonemic functions (i.e. 'wild, mild).

For example, use flash cards to distinguish the students' ability to hear the phonemic component in words. Do not go on to Step 3 unless the student can identify long 'i' with 'ld' and 'nd'.

3. Apply the graphic representation of phonemes and orthographic rule to words with an increasing number of phonemic components and functions in a building block fashion so as to maintain the primary concept in conjunction with the review of already learned material (i.e. bind, blind, blinding, grind, grinded).

For example, use flash cards to distinguish the students' ability to hear the primary phonemic component with additional components in words (i.e. blind—'bl' blend with long 'i' and ending blend 'nd').

4. Apply the diacritical markings to verify the use of each letter that represents the phonemic and orthographic pattern (i.e. for the word 'blind' the beginning and ending blends are marked with a circle and 'i' has a dash placed over it).

For example, use classroom exercises on the blackboard where students mark the words to demonstrate the graphic representations of phonemes and orthographic patterns.

5. Conduct a reading and spelling test.

For example, use a spelling test to identify the students' ability to know the words independently without requiring any mnemonic devices (i.e. story, puppet, song, flashcard).

How to use the teaching program: As shown in FIG. 6, the teaching methodology of the invention may use a variety of teaching tools to reinforce the student's learning. For example, a Teacher's Guide may be provided with detailed plans, teaching scripts, assessments, and integrated program materials including student workbooks (approximately 3-4 pages per lesson), audio tape/CD, magnetic learning games, readers and puppets.

Word Charts: Word charts of the type described in detail above provide complete word lists that correspond to the phonemic and orthographic concepts described in the Teacher's Guides and Student Workbooks. The charts illustrate all spelling patterns to demonstrate whether an orthographic rule holds true for five words or five hundred. The charts also effectively introduce progressive levels of difficulty for suitable structure with the learning—challenged, average or gifted learner. For example, FIGS. 2*a* and 2*b* illustrate a progressive sequence for teaching short vowels with ending consonants. FIG. 3 illustrates an orthographic comparison for teaching long vowels and dipthongs, while FIG. 4 illustrates the word chart categorizations for long vowels and dipthongs to encompass a larger universe of words, including multi-syllabic words, overlapping graphic representations (homonyms and similar problems) and suffixed words. Additional charts may become apparent to those skilled in the art upon implementation of the teaching technique of the invention.

Student Workbooks: Student workbooks may be provided in accordance with the learning level of the student. For example:

Level A teaches the students the letters of the alphabet, how to form each letter, identify the visual components of the letters, and articulate the letter sounds in the beginning, medial, and final position of words. Instruction in short vowel sounds is provided as applicable to two and three letter words followed by one consonant, the two sounds of 'c' and 'g', irregular ending consonants (called Consonant Cliffz) long vowels with silent 'e', blends, digraphs and basic suffixes— over 16,000 words. Students learn to read, write, and comprehend sentences and simple paragraphs.

Level B builds on the previous material to provide a systematic review of the phonemic and orthographic concepts taught in Level A. This material supplies instruction in long vowel teams, silent 'e' with 'g' and 'v', diphthongs, irregular vowel sounds with 'r', and 'a' and 'o' with 'l' and 'n'—over 25,000 words. Introductory story writing techniques with an integrative approach to applying sight words provides a solid foundation for the students to progress with ease in their reading abilities.

Level C provides a systemic review of the phonemic and orthographic concepts taught in the earlier levels to insure a comprehensive understanding of the structure of the English language. The instruction strategically builds upon the student's ability to read, write, and speak using multisyllabic words and interchangeable suffixes.

Teacher's Guides: Teacher's Guides correspond with each student workbook and provides the teacher with lesson objectives, a list of materials, step-by-step procedures, and learning activities using the student workbooks, puppets, readers, and magnetic learning games.

Thematic Posters: Thematic Posters graphic illustrations to support the student's learning of increasingly complex patterns with mnemonic devices that are already known e.g., the Alphabet Crew characters demonstrate the phonemic and/or orthographic concepts.

Student Readers: Student Readers use comprehension strategies to support reading with understanding. Each reader is designed with words containing specific phonemic and orthographic concepts to provide 80% decodable text for Level A, and 70% decodable text for Level B and Level C.

Magnetic Learning Games: Magnetic Learning Games provide an alternative genre for reteaching the sight words with the Word Memory game and building vocabulary with Rythme Time, Poems and Opposites. These learning games are designed for flexible integration in the classroom schedule when the students require a change of pace from the other learning activities.

Audio tape/CD/interactive computer devices: Audio tapes/ CDs/interactive computer devices reinforce the phonemic and orthographic concepts with songs and stories.

Alphabet Crew Puppets: Alphabet Crew Puppets provide unique opportunities to develop story telling, listening, and speaking skills as well as facilitates eye-hand coordination. The Alphabet Crew characters are designed to support the learning of the letter sounds. For example, the afore-mentioned character Echo E teaches both the long and short sounds of 'e.'

Repetitive Practice: A Process of Review to Support New Learning.

Meaningful practice helps students internalize the various word features for automatically in using what they have learned. The following components provide repetitive practice:

Readers: Students benefit from repeated readings of predictable texts to support the development of decoding strategies and the acquisition of sight words.

Flashcards and Learning Games: teach the students to recognize words in texts, and produce words in writing in a fast and accurate manner so that the focus of their attention is on making meaning.

Although exemplary implementations of the invention have been described in detail above, those skilled in the art will readily appreciate that many additional minor modifications are possible in the exemplary embodiments without materially departing from the novel teachings and advantages of the invention. For example, the teaching method of the invention may include comparing a phonemic system in English of short vowels, long vowels, digraphs, and schwa with another language. Any such minor modifications are intended to be included within the scope of this invention as defined by the following exemplary claims.

The invention claimed is:

1. A word decoding and encoding system, comprising:
 a non-transitory medium having word charts disposed thereon, said word charts comprising graphic representations of phonemes and phoneme clusters containing vowel-consonant relationships therein in a hierarchical order based on progressive levels of difficulty of function and frequency of use of said graphic representations of phonemes and phoneme clusters, said word chart order including increasing levels of complexity of one sound-to-many orthographic patterns or many sounds-to-one orthographic pattern; and
 information-laden mnemonic devices including at least one of a picture, an icon, a card, a puppet, a model, an audio cassette, a compact disk, and an interactive computer device determined by the hierarchical order of said word charts,
 whereby said information-laden mnemonic devices are configured to introduce said phonemes and phoneme clusters to students according to said increasing levels of complexity of said vowel-consonant relationships of said phonemes and phoneme clusters in said word charts, and
 whereby each new phoneme or phoneme cluster, after an initial phoneme or phoneme cluster, is introduced to students using, in a building block fashion, word charts including words comprising the vowel-consonant relationships of phonemes or phoneme clusters that have already been taught to the students.

2. A system as in claim 1, wherein each word chart is arranged to include words comprising the vowel-consonant relationships of phonemes or phoneme clusters that have already been taught to the students in a previous word chart and one new phoneme or phoneme cluster.

3. A system as in claim 1, wherein at least one word in said word chart includes specific markings labeling a function(s) of a letter(s) in a context of a group of letters in a word.

4. A system as in claim 1, wherein the word charts identify a changing position of a schwa in relation to accented syllables.

5. A system as in claim 1, wherein said word charts present the application of suffixes according to a root word in a systematic fashion.

6. A system as in claim 1, wherein said word charts compare a phonemic system in English of short vowels, long vowels, digraphs, and schwa with another language.

7. A system as in claim 1, wherein at least one of said word charts includes at least one of a one sound-to-one orthographic pattern, many sounds-to-one orthographic pattern, and one sound-to-many orthographic patterns.

8. A system as in claim 1, wherein said information-laden mnemonic devices are arranged to assess a student's awareness of the vowel-consonant relationships of graphic representations of phonemes and phoneme clusters.

* * * * *